M. H. Thomas.
Churn Dasher.
No. 82,892.  Patented Oct. 6, 1868.
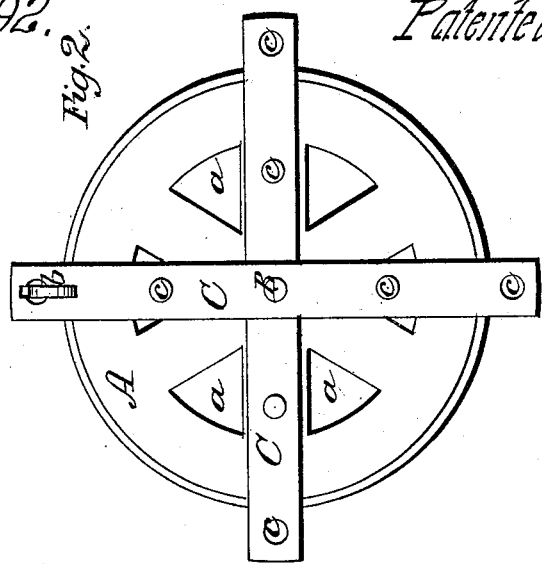
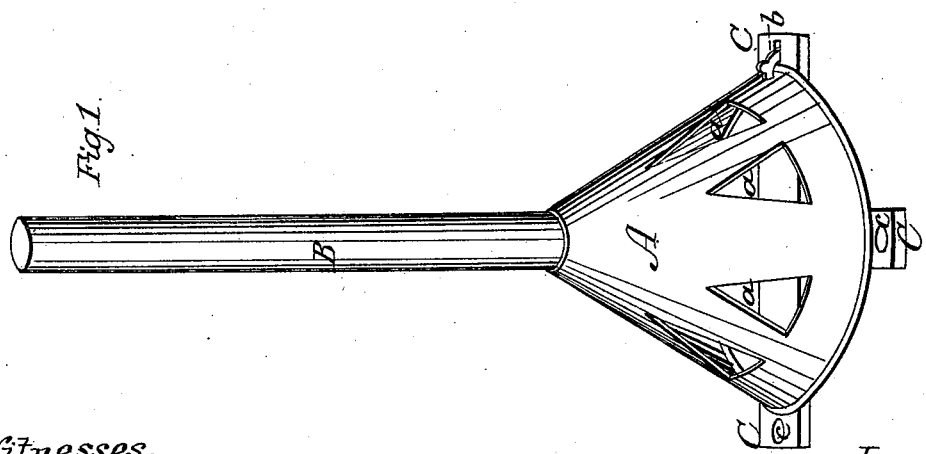
Witnesses
J. Alfred Ellis
D. N. Mister
Inventor
M. H. Thomas
per
T. H. Alexander Atty.

United States Patent Office.

MORGAN H. THOMAS, OF DANSVILLE, NEW YORK.

Letters Patent No. 82,892, dated October 6, 1868.

IMPROVEMENT IN CHURN-DASHERS.

*The Schedule referred to in these Letters Patent and making part of the same.*

TO ALL WHOM IT MAY CONCERN:

Be it known that I, MORGAN H. THOMAS, of Dansville, in the county of Livingston, and State of New York, have invented certain new and useful Improvements in Churn-Dashers; and I do hereby declare that the following is a full, clear, and exact description thereof, reference being had to the accompanying drawings, and to the letters of reference marked thereon, which form a part of this specification, and in which—

Figure 1 represents a perspective view, and

Figure 2 an inverted view of my churn-dasher.

The nature of this invention consists in the employment of a cone-shaped device, provided with like-shaped openings or holes, and to it is hinged a perforated cross-piece or dasher, held thereto substantially as will be hereinafter set forth.

To enable others skilled in the art to which my invention appertains to make and use the same, I will now proceed to describe its construction and operation.

In the accompanying drawings, A represents the cone-shaped device, which is provided, on its lower portion or circumference, with openings or holes $a$, also made cone-shaped, as seen in the two figures. B designates the dasher-staff, passing through the device A, to which said device is secured, by means of a neck or tube formed on its inner upper surface, the lower end of dasher-staff B being made to enter an opening in the dasher C, which consists of two bars, placed across and at right angles with each other, and provided with holes or perforations $c\ c$. Upon one end of one of the bars of the dasher C is hinged the cone-shaped device A, the opposite end of said bar being furnished with a hook or clasp, $b$, which catches into an opening in the lower edge of A, when the dasher is in operation.

The operation of my invention is as follows:

The staff B being elevated, will be depressed, causing the milk to rush through the holes in the dasher C, and the space between said dasher and the inner circumference of A. At the same time the milk is thus being operated upon, the air caused by the downward pressure of the cone-shaped device A will force the milk through the openings $a\ a$ in said device, thus thoroughly churning the milk. After this is done, the butter on the inner surface of A may be removed by merely unclasping it from the dasher C, it being hinged thereto, as already described.

Having thus described my invention, what I claim, and desire to secure by Letters Patent, is—

The cone-shaped top, A, perforated with holes $a\ a$, as described, and dasher-rod B, in combination with the cross-bars C C, when the latter are hinged to the lower part of the top, A, on one side, and fastened to the opposite side of said top, A, by a clasp, all arranged, constructed, and operated in the manner and for the purpose set forth.

In testimony that I claim the foregoing as my own, I affix my signature in presence of two witnesses.

MORGAN H. THOMAS.

Witnesses:
M. D. BROWN,
S. D. FAULKNER.